US008793312B2

(12) United States Patent
Tao et al.

(10) Patent No.: US 8,793,312 B2
(45) Date of Patent: Jul. 29, 2014

(54) BRIDGING SOCIAL SILOS FOR KNOWLEDGE DISCOVERY AND SHARING

(75) Inventors: Yicheng Tao, San Jose, CA (US); Stephen Daniel Bochinski, San Jose, CA (US); Sonali Mihir Sambhus, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 98 days.

(21) Appl. No.: 13/112,431

(22) Filed: May 20, 2011

(65) Prior Publication Data
US 2012/0296967 A1 Nov. 22, 2012

(51) Int. Cl.
*G06F 15/16* (2006.01)

(52) U.S. Cl.
USPC .......................................................... 709/204

(58) Field of Classification Search
CPC ................................ G06F 15/16; G06F 5/025
See application file for complete search history.

(56) References Cited

U.S. PATENT DOCUMENTS

| | | | | |
|---|---|---|---|---|
| 8,260,252 B2 * | 9/2012 | Agarwal | ....................... | 455/405 |
| 2002/0016786 A1 * | 2/2002 | Pitkow et al. | ...................... | 707/3 |
| 2003/0028596 A1 * | 2/2003 | Toyota et al. | ................. | 709/204 |
| 2004/0122803 A1 * | 6/2004 | Dom et al. | ........................ | 707/3 |
| 2007/0067405 A1 * | 3/2007 | Eliovson | ...................... | 709/206 |
| 2008/0052387 A1 * | 2/2008 | Heinz et al. | .................... | 709/223 |
| 2008/0140643 A1 * | 6/2008 | Ismalon | ............................ | 707/5 |
| 2008/0294768 A1 * | 11/2008 | Sampson et al. | .............. | 709/224 |
| 2009/0018918 A1 * | 1/2009 | Moneypenny et al. | ......... | 705/14 |
| 2009/0144075 A1 * | 6/2009 | Flinn et al. | ......................... | 705/1 |
| 2009/0287694 A1 * | 11/2009 | McGowan et al. | ............... | 707/5 |
| 2010/0030713 A1 * | 2/2010 | Simpson et al. | ................ | 706/11 |
| 2010/0268661 A1 | 10/2010 | Levy et al. | | |
| 2010/0293125 A1 | 11/2010 | Simmons et al. | | |
| 2010/0332542 A1 | 12/2010 | Jackson | | |
| 2012/0078713 A1 * | 3/2012 | Smith et al. | ................ | 705/14.52 |

OTHER PUBLICATIONS

Kasarapu et al., "Exploring Social Patterns in Moile Data", Apr. 2010, IEEE, p. 62-68.*
Jin et al., "A Web Recommendation System Based on Maximum Entropy", Apr. 2005, IEEE, vol. 1, p. 213-218.*
Lu et al., "The Topic-Perspective Model for Social Tagging Systems", Jul. 2010, ACM, p. 683-691.*

(Continued)

*Primary Examiner* — Eleni Shiferaw
*Assistant Examiner* — Demaris Brown
(74) *Attorney, Agent, or Firm* — Edell, Shapiro & Finnan, LLC (57) ABSTRACT

Techniques are provided herein for obtaining network usage information about a plurality of users, analyzing the network usage information to detect a plurality of subjects and determine a set of relationship scores describing the strength of the relationship between users and subjects, and analyzing the sets of relationship scores to detect a plurality of virtual communities formed among the users. The virtual communities are used to detect subjects to recommend to members of the virtual communities, such as topics or content items that other users of the community have found of interest.

13 Claims, 8 Drawing Sheets

(56) References Cited

OTHER PUBLICATIONS

Gaston et al., "Topic-Based Social Network Analysis for Virtual Communties of Interests in the Dark Web", Jul. 2010, ACM, Article No. 9, p. 1-9.*
Bhattacharya et al., "A Latent Dirichlet Allocation Model for Entity Resolution," Aug. 1, 2005, pp. 1-15.
Blei et al., "Supervised and Relational Topic Models", Department of Computer Science Princeton University, Oct. 5, 2009, 58 pages.
Pathak et al., "Social Topic Models for Community Extraction," Aug. 24, 2008, The 2nd SNA-KDD Workshop '08, 10 pages.
Tuulos et al., "Combining Topic Models and Social Networks for Chat Data Mining," Jul. 4, 2004 HIIT Technical Report 2004-13, 11 pages.
Xu et al., "Named Entity Mining from Click-Through Data Using Weakly Supervised Latent Dirichlet Allocation," KDD '09, (2009), 9 pages.

* cited by examiner

BRIDGING SOCIAL SILOS FOR KNOWLEDGE DISCOVERY AND SHARING

TECHNICAL FIELD

The present disclosure relates generally to knowledge discovery and sharing, and more particularly to bridging social silos to improve knowledge discovery and sharing.

BACKGROUND

Knowledge sharing is often built among a group of people within a particular department or sub-organization of an enterprise such as a business or institute. Knowledge beyond a user's own department or sub-organization is hard to acquire unless another user explicitly shares it. Sharing user's knowledge implicitly has great value, for example by presenting users with information regarding "top items of interest", however such sharing can easily result in information overload because it does not take into account user's specific interests, and may be limited to a user's own social "silo" or explicit community.

Users have become familiar with personalized recommendation systems, for example when shopping on internet shopping sites they may be presented with purchase suggestions ("Shoppers who purchased this item also purchased these items . . . "), and implementing similar personalized recommendation systems into enterprise networks may have similar advantages of allowing a user to take advantage of the knowledge or preferences of other users who are similarly situated or who have similar interests. However, because the enterprise categorizes users into communities based on factors such as physical location, job title, and the like, existing recommendation systems do not discover or share knowledge with users in an optimal fashion that is customized to a user's interests.

DESCRIPTION OF EXAMPLE EMBODIMENTS

Overview

Various examples are provided of computer-implemented methods, apparatuses, and computer readable media encoded with instructions for obtaining network usage information about a user, detecting a plurality of subjects by analyzing the network usage information, analyzing the network usage information of the user to determine a set of relationship scores, analyzing the set of relationship scores and relationship scores of other users to detect a plurality of virtual communities, and recommending one or more content items stored in a storage area to the user based on the virtual communities of which the user is a member. Each relationship score describes the strength of a relationship between the user and an individual subject in the plurality of subjects, and the user may be a member of more than one virtual community.

Example Embodiments

Figure 1:
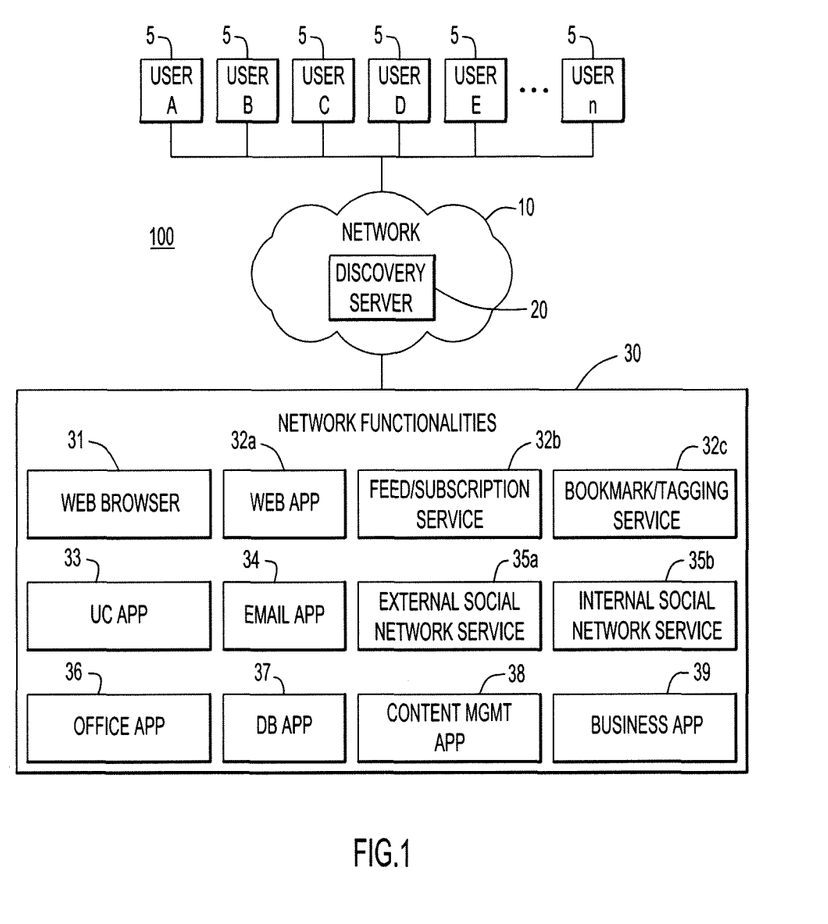
FIG. 1 is an example of a block diagram showing a user environment in which knowledge discovery and sharing may be established.

Referring now to the Figures, an example of a block diagram showing a user environment in which social silos may be bridged in order to discover and share knowledge is shown in FIG. 1. The depicted user environment 100 includes multiple client devices 5, connected over network 10 to each other, to discovery server 20, and to multiple network functionalities 30.

The user environment 100 may include additional servers, clients, and other devices not shown, and individual components of the system may occur either singly or in multiples, for example, there may be more than one discovery server 20, and other networking components, e.g., routers and switches, may be used in the user environment 100. The user environment 100 may be implemented in a client-server system, database system, virtual desktop system, distributed computer system, cloud-based system, clustered database, data center, storage area network (SAN), or in any other suitable system, for example in a system designed for the provision of Software-as-a-Service (SaaS), such as a cloud data center or hosted web service.

The example user client devices 5 may each be any conventional or other computer system or device, such as a thin client, computer terminal or workstation, personal desktop computer, laptop or netbook, tablet, cellular phone, set-top box, networked television, or other device capable of acting as a client in the described user environment.

Network 10 represents any hardware and/or software configured to communicate information via any suitable communications media (e.g., WAN, LAN, Internet, Intranet, wired, wireless, etc.), and may include routers, hubs, switches, gateways, or any other suitable components in any suitable form or arrangement. The various components of the user environment 100 may include any conventional or other communications devices to communicate over the networks via any conventional or other protocols, and may utilize any type of connection (e.g., wired, wireless, etc.) for access to the network.

Discovery server 20 may be, for example, any suitable computer system or device capable of acting as a discovery server in the described embodiments, such as a computer terminal or workstation, personal desktop computer, laptop or netbook, tablet, cellular phone, set-top box, networked television, or other device capable of acting as a server in the described user environment. In an example embodiment, the discovery server is a computing blade, a blade server comprising one or more solid state drives, or a blade center comprising one or more blade servers together with a blade chassis comprising common resources such as networking connections, input/output device connections, power connections, cooling devices, switches, etc. The discovery server 20 may be a component of a larger system, such as a Cisco Unified Computing System, or a data center that centralizes enterprise computing resources.

The network functionalities 30 may be any service, application, access, software, or other functionality provided to users of a network. Depicted in FIG. 1 are an assortment of example network functionalities 30, however it is understood that the functionalities are not so limited, and these depictions are illustrative only. The depicted functionalities 30 include web browser(s) 31, web application(s) 32a, feed/subscription services 32b such as FeedDemon, Google Reader, or Reeder, bookmark/tagging services 32c such as delicious, Digg, Reddit or StumbleUpon, Unified Communications (UC) application(s) 33, email application(s) 34, and social network service 35, which may be an external social network service 35a such as Bebo, Facebook, hi5, LinkedIn, LotusLive Connections, Meetup, Myspace, Ning, Orkut, Plaxo, and Twitter, or an internal social network service 35b such as Cisco Pulse, Cisco Quad, IBM Lotus Connections, SharePoint, Socialcast, and Yammer. The depicted functionalities 30 also include office application(s) 36 such as word processing, spreadsheet or presentation software, database application(s) 37, content management application(s) 38, and other business application(s) 39.

Figure 2:
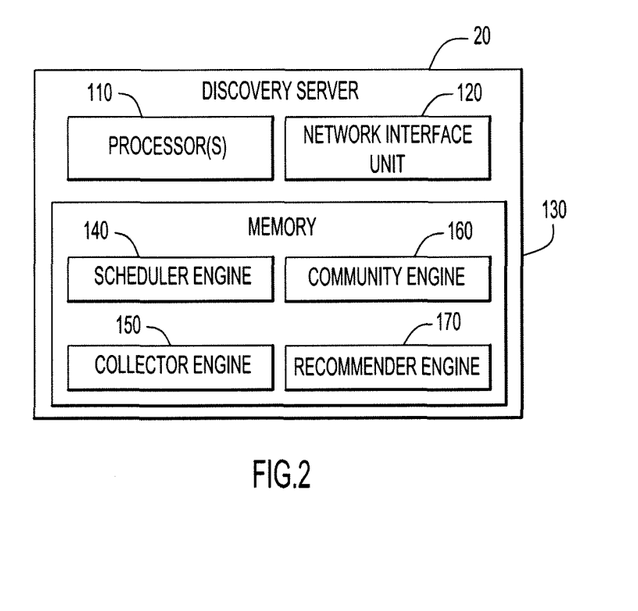
FIG. 2 is an example of a block diagram showing an example discovery server that may be used in the user environment.

As shown in FIG. 2, an example discovery server 20 comprises one or more processors 110, network interface unit 120, and memory 130. The processor 110 is, for example, a data processing device such as a microprocessor, microcontroller, systems on a chip (SOCs), or other fixed or programmable logic, that executes instructions for process logic stored in memory 130. The network interface unit 120 enables communication throughout the user environment 100 shown in FIG. 1. Memory 130 may be implemented by any conventional or other memory or storage device, and may include any suitable storage capacity. For example, memory 130 may comprise read only memory (ROM), random access memory (RAM), erasable programmable read-only memory (EPROM), magnetic disk storage media devices, optical storage media devices, flash memory devices, electrical, optical, or other physical/tangible memory storage devices. The memory 130 may comprise one or more computer readable storage media (e.g., a memory device) encoded with software comprising computer executable instructions and when the software is executed (by processor 110) it is operable to perform the operations described herein in connection with FIGS. 7-9.

Resident in memory 130 are scheduler engine 140, collector engine 150, community engine 160, and recommender engine 170. Further operation of the engines is explained below with reference to FIGS. 7-9. Although these various engines 140-170 are described herein as separate engines, it is understood that this is only one example of how the discovery server 20 may carry out its functions, and that the functions described herein may be carried out by any number of suitable engines, for example a single engine may perform all four functions of scheduling, collecting, detecting communities and recommending subjects, two engines may each perform all four functions or some subset thereof, or any number of engines may perform any combination of one or more of the functions.

Figure 3:
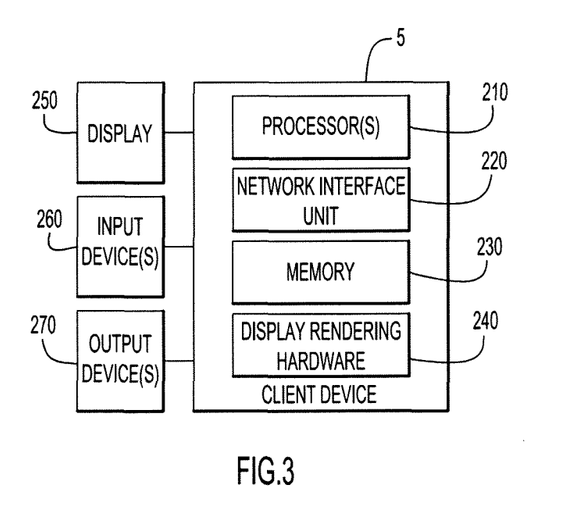
FIG. 3 is an example of a block diagram showing an example client device that may be used in the user environment.

As shown in FIG. 3, an example client device 5 comprises one or more processors 210, a network interface unit 220, memory 230, and display rendering hardware 240. The processor 210 is, for example, a data processing device such as a microprocessor, microcontroller, systems on a chip (SOCs), or other fixed or programmable logic, that executes instructions for process logic stored in memory 230. The network interface unit 220 enables communication throughout the user environment 100 shown in FIG. 1. Memory 230 may be implemented by any conventional or other memory or storage device, and may include any suitable storage capacity. For example, memory 230 may comprise read only memory (ROM), random access memory (RAM), erasable programmable read-only memory (EPROM), magnetic disk storage media devices, optical storage media devices, flash memory devices, electrical, optical, or other physical/tangible memory storage devices. The memory 230 may comprise one or more computer readable storage media (e.g., a memory device) encoded with software comprising computer executable instructions and when the software is executed (by processor 210) it is operable to perform the operations described herein in connection with FIGS. 7-9. Display rendering hardware 240 may be a part of processor 210, or may be, e.g., a separate graphics processor, e.g., a Graphics Processor Unit (GPU).

The example client device 5 interfaces with display device 250, input device(s) 260, and output device(s) 270, and communicates with these devices in any suitable fashion, e.g., via a wired or wireless connection. The display device 250 may be any suitable display, screen or monitor capable of displaying information to a user of a client device, for example the screen of a tablet or the monitor attached to a computer workstation. Input device(s) 260 may include any suitable input device, for example, a keyboard, mouse, trackpad, touch input tablet, touch screen, camera, microphone, remote control, speech synthesizer, or the like. Output device(s) 270 may include any suitable output device, for example, a speaker, headphone, sound output port, or the like. The display device 250, input device(s) 260 and output device(s) 270 may be separate devices, e.g., a monitor used in conjunction with a microphone and speakers, or may be combined, e.g., a touchscreen that is a display and an input device, or a headset that is both an input (e.g., via the microphone) and output (e.g., via the speakers) device.

The functions of the processors 110 and 210 may each be implemented by a processor or computer readable tangible (non-transitory) medium encoded with instructions or by logic encoded in one or more tangible media (e.g., embedded logic such as an application specific integrated circuit (ASIC), digital signal processor (DSP) instructions, software that is executed by a processor, etc.), wherein the memories 130 and 230 each store data used for the computations or functions described herein (and/or to store software or processor instructions that are executed to carry out the computations or functions described herein). Alternatively, one or more computer readable storage media are provided and encoded with software comprising computer executable instructions and when the software is executed operable to performing the techniques described herein. Thus, functions of the process logic as described with reference to FIGS. 7 through 9, for example, may be implemented with fixed logic or programmable logic (e.g., software or computer instructions executed by a processor or field programmable gate array (FPGA)).

Figure 4:
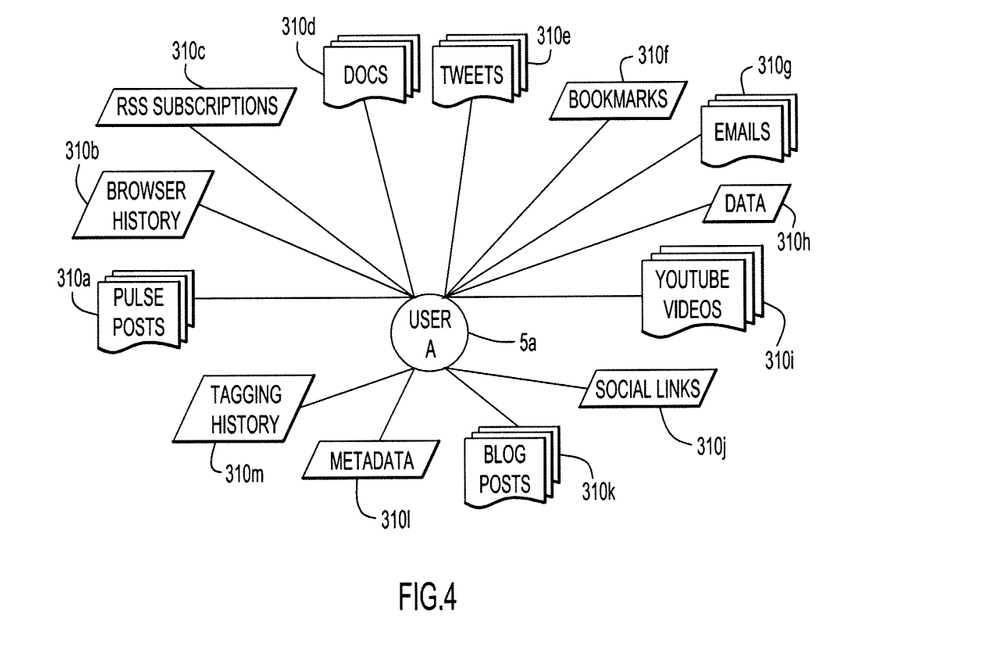
FIG. 4 is an example of a schematic diagram showing example network usage information about a user in the user environment.

FIG. 4 is an example of a schematic diagram showing example network usage information obtained or collected by discovery server, and particularly collector engine 150, e.g., information about the interaction of user A 5a with a variety of content items 310 in the user environment. A "content item" as used herein is any type of electronic file or data now known or later developed, such as, but not limited to posts such as blog or social network posts or status updates (310a, 310k), HTML and XML Web content (or lists thereof such as a browser history file 310b), topic or feed subscriptions (e.g., RSS subscriptions 310c), documents (310d), images, electronic records, database records, word processing documents, presentation slides, office documents, SMS or MMS messages, chat or other instant messages, UC communications, tweets (310e), bookmark or tag files (310f, 310m), e-mail messages or archives (310g), games, textual data, electronic books, graphics, audio, video (e.g., YouTube videos 310i), social network data such as a "friends list" or "liked pages" (310j), metadata (310l), other digital representations of information (310h), and/or combinations thereof.

The network usage information about a user includes information about that user's interaction with a variety of content items and other users, e.g., communication data among users, content access behavior such as accessing, editing, creating or printing documents or other files, searching and browsing the Internet, social network behavior such as posting comments, status updates, or linking to another user, rating search results or recommended content, watching videos on a video sharing site such as YouTube, etc. It is understood that while only a few types of network usage information are depicted, these depicted examples are not limited, and any facet of a user's interaction with a particular network, subjects, or functionalities may be monitored in the present embodiments. It is also understood that while only a single user is depicted, this is for the purposes of simplifying the illustrations, and the various implementations of the present embodiments will monitor and obtain network information about multiple users.

Figure 5:
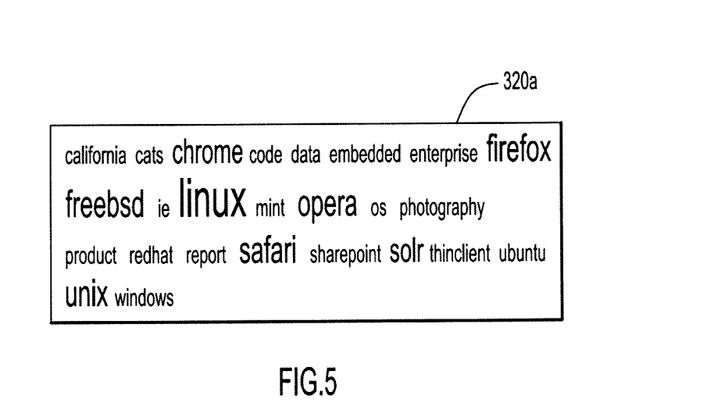
FIG. 5 is an example of a schematic diagram of a tag cloud showing topics that are related to a user in the user environment.

FIG. 5 is an example of a schematic diagram of a tag cloud 320a showing topics that are related to a user in the user environment. In the present embodiments, the network usage information gathered about each user is transformed into a format usable by the various components of the discovery server 20. For example, some network usage information may be analyzed statistically, some may be transformed into a format suitable for the community engine 160 and recommender engine 170 to use, by, e.g., constructing a tag cloud, normalizing scores based on usage information, counting frequencies of association with a particular topic or content item, or the like, etc. In the depicted example, the collected network usage information about user A from FIG. 4 has been transformed into a tag cloud, which is a visual representation of the subjects that are most strongly related to the user. The more important topics for a user, e.g., topics that are most strongly related to the user, or most frequently mentioned, etc., are shown in larger type, whereas the less important topics are shown in smaller type.

As used herein, a "subject" may be a content item, topic, or concept. A "topic" is a category or theme that a content item may discuss, concern, relate or, or otherwise be connected to in a discernable fashion. A "concept" is a group of topics that are related to each other or that are highly co-occurrent with each other. For example, as shown in FIG. 5, the tag cloud 320a depicts the top 25 topics (e.g., Linux, Safari, Opera) that are related to user A, for example because user A has created documents about these topics, has sent and received emails with other users concerning these topics, subscribes to feeds about these topics, etc. These topics may be grouped into concepts, as shown in Table 1.

TABLE 1

| | Concepts | | | | |
|---|---|---|---|---|---|
| | Browsers | Operating Systems | Enterprise Systems | Hobbies | (no concept) |
| Topics | Chrome Firefox IE Opera Safari | Embedded FreeBSD Linux Mint OS Redhat Ubuntu Unix Windows | Enterprise Redhat SharePoint Solr | cats photography | california code data product report thinclient |

The discovery of topics in the network usage information, the relationship between topics and users, and the grouping of topics into concepts may be accomplished in any suitable fashion. For example, statistical correlation models such as similarity or k-nearest neighbor algorithms may be used to discovery statistical correlations (relationships) between a user and various topics, and between/among various topics, and topic models such as a latent Direchlet allocation (LDA) or probabilistic latent semantic indexing (PLSI) may be used to detect and group topics and concepts.

It is not required that a tag cloud be generated, and the tag cloud may be omitted or the data represented by the tag cloud may be further transformed into a form suitable for further analysis, for example a set of relationship scores, which may be organized into one or more [user x subject] matrices. These matrices may comprise, for example, a [user x topic] matrix, a [user x content item] matrix, and a [user x concept] matrix. An example [user x topic] matrix constructed from the obtained network usage information about a plurality of users is shown as Table 2. The relationship score shown for the intersection of the users and each topic may represent a frequency count, a normalized score, or any other suitable value that will enable the present embodiments to discover and share knowledge.

TABLE 2

| [User x Topic] | | | | | |
|---|---|---|---|---|---|
| | Java | Linux | Solr | ... | Topic x |
| User A | 0 | 62 | 15 | ... | 21 |
| User B | 2 | 0 | 48 | ... | 17 |
| User C | 7 | 1 | 8 | ... | 39 |
| User D | 35 | 75 | 3 | ... | 3 |
| User E | 59 | 3 | 10 | ... | 15 |
| User F | 4 | 2 | 55 | ... | 6 |
| ... | ... | ... | ... | ... | ... |
| User y | 14 | 9 | 31 | ... | 5 |

Figure 6:
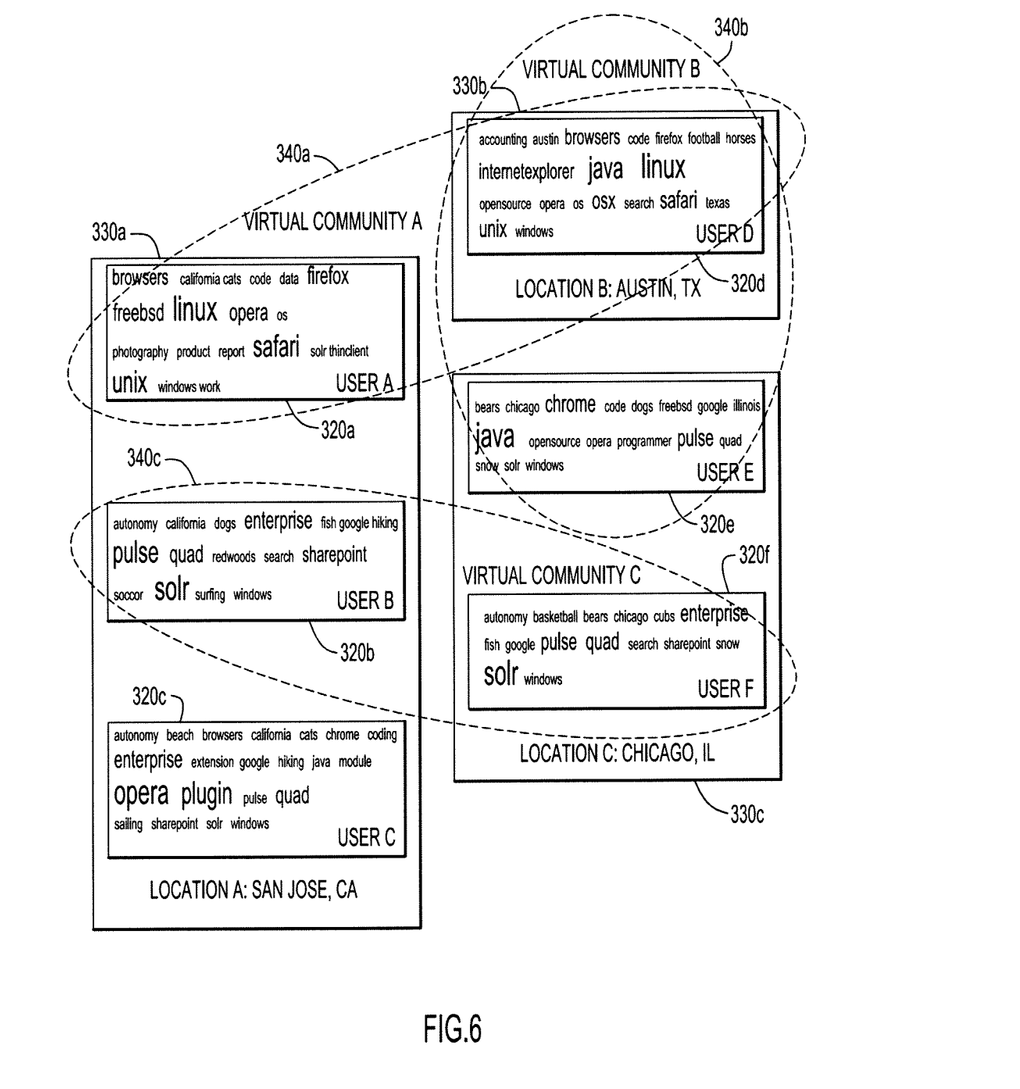
FIG. 6 is a schematic diagram showing three example virtual communities formed among users in a user environment.

FIG. 6 is a schematic diagram showing three example virtual communities formed among users in a user environment. As shown in the example tag clouds 320a-320f, each corresponding to one of six users A through F, each user is related to a number of topics at different intensities. The users (as represented by their corresponding tag clouds 320) are grouped into "silos" 330 based on a non-subject-related characteristic, for example physical location, business department, job description, pay grade, etc. Depicted here are three different physical locations "San Jose" 330a, "Austin" 330b, and "Chicago" 330c. Using the tag clouds, or [user x subject] matrices, or in some other suitable fashion, the discovery engine 20 and more particularly the community engine 160 analyzes each user's relationship to the various subjects, and bridges the silos in order to bring together users from different silos with similar interests into virtual communities 340.

In the depicted example, the virtual communities are formed on the basis of common topics. For example, the community engine 160 may analyze the [user x subject] matrix to generate two additional matrices, a [topic x community matrix] and a [user x community matrix]. An example of each of these matrices is shown in Tables 3 and 4. This analysis may involve any suitable model or method. For example, statistical correlation models such as similarity or k-nearest neighbor algorithms may be used to discovery statistical correlations (relationships) between topics and/or content items, and between/among users, and topic models such as a latent Direchlet allocation (LDA) or probabilistic latent semantic indexing (PLSI) may be used to detect and group users, topics and concepts.

TABLE 3

[Topic x Community]

| | Java | Linux | Safari | Solr | Unix | ... | Topic x |
|---|---|---|---|---|---|---|---|
| Community A | 5 | 73 | 23 | 10 | 15 | ... | 20 |
| Community B | 55 | 10 | 4 | 15 | 7 | ... | 5 |
| Community C | 7 | 3 | 9 | 82 | 2 | ... | 24 |
| Community D | 12 | 15 | 65 | 3 | 31 | ... | 3 |
| Community E | 26 | 3 | 14 | 10 | 81 | ... | 15 |
| Community F | 4 | 2 | 18 | 25 | 7 | ... | 66 |
| ... | ... | ... | ... | ... | ... | | ... |
| Community z | 55 | 9 | 49 | 12 | 4 | ... | 5 |

TABLE 4

[User x Community]

| | Community A | Community B | Community C | ... | Community z |
|---|---|---|---|---|---|
| User A | 71 | 5 | 13 | ... | 21 |
| User B | 3 | 6 | 63 | ... | 17 |
| User C | 4 | 8 | 12 | ... | 59 |
| User D | 82 | 64 | 3 | ... | 3 |
| User E | 12 | 68 | 10 | ... | 15 |
| User F | 4 | 2 | 74 | ... | 6 |
| ... | ... | ... | ... | | ... |
| User y | 14 | 9 | 31 | ... | 5 |

In the example shown, the community engine 160 has determined that users A and D share a strong relationship with topic "Linux", and also have moderate shared relationships with topics "Safari" and "Unix." Thus, the community engine 160 groups together users A and D (as depicted by their corresponding tag clouds 320a, 320d) into Virtual Community A 340a. Similarly, the community engine 160 has determined that users D and E share a strong relationship with topic "Java", and has accordingly grouped users D and E (as depicted by their corresponding tag clouds 320d, 320e) into Virtual Community B 340b, and has also determined that users B and F share a strong relationship with topic "Solr", and has accordingly grouped users B and F (as depicted by their corresponding tag clouds 320b, 320f) into Virtual Community C 340c.

As shown in this example diagram, a user such as User D (depicted by her corresponding tag cloud 320d) may belong to more than one virtual community. Although this example shows the virtual communities as formed on the basis of common topics, the communities may also be formed on the basis of common concepts, common content items, similar network usage information, and the like. Because each user may have relationships with dozens or hundreds of subjects, and because the virtual communities provide value to the users based on the idea of common subjects, there may be a cut-off relationship score for determining whether a user is a member of a particular virtual community. For example, there may be a predetermined minimum score (e.g., 50 or higher out of a possible 100), or there may be a predetermined maximum number n of users in a particular virtual community (e.g., 100 users) so that, e.g., the set of n users having the highest relationship scores with a particular community are considered members of that community.

Figure 7:
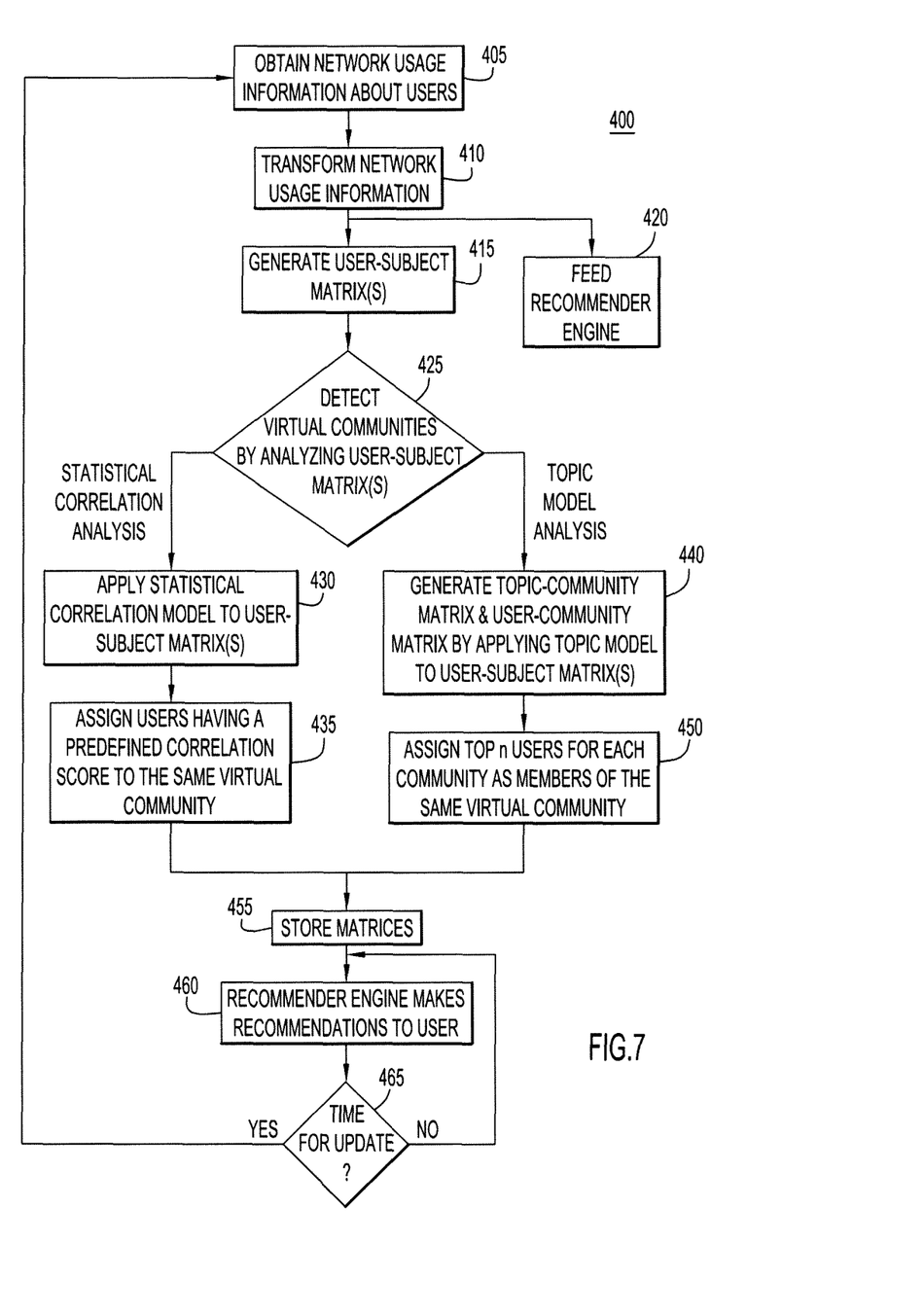
FIG. 7 is an example of a flow chart generally depicting a process of bridging social silos to discover virtual communities in the user environment.

FIG. 7 is an example of a flow chart generally depicting a process 400 of bridging social silos to discover virtual communities in the user environment that is performed by the discovery server 20, and more particularly the collector engine 150 and community engine 160. In step 405, the collector engine 150 obtains network usage information about users in the network. This may be accomplished in any suitable manner, for example users may opt-into a monitoring process by signing up for a virtual community account and permitting it access to monitor a user's activity, the network may monitor user activity in a manner that is transparent to the users, or in any other suitable fashion.

In step 410 the discovery server 20 transforms the network usage information, for example by constructing a tag cloud, determining a set of relationship scores, normalizing scores based on usage information, counting frequencies of association with a particular topic or content item, or the like, and then in step 415 generates one or more [user x subject] matrices, for example a [user x topic] matrix and/or a [user x content item] matrix. In step 420, the collector engine 150 feeds the network usage information and/or the generated matrices to the recommender engine 170 for recommendation processing, as is further described with respect to FIGS. 8 and 9. In step 425, the community engine 160 detects the virtual communities by analyzing the [user x subject] matrices. This analysis may occur in any suitable fashion, for example using statistical correlation analysis (as shown in steps 430-435) or using topic model analysis (as shown in steps 440-450).

If statistical correlation analysis is used, then in step 430 the community engine applies a statistical correlation model such as a similarity or k-nearest neighbor model to the input matrices to discover statistical correlations (relationships) between/among topics and/or content items, and between/among users. In step 435 the community engine assigns users to virtual communities, for example by assigning users meeting a predetermined minimum score to the same virtual community, or in any other suitable fashion. The statistical correlation model may be any suitable model, for example a similarity model such as a Pearson, Euclidean, Tanimoto (extended Jaccard) or Log-Likelihood model, a nearest neighbor model such as a k-nearest neighbor model or an approximate nearest neighbor model (e.g., a Best Bin First or E-approximate nearest neighbor search model), or a singular value decomposition (SVD) model. In one example embodiment, the statistical correlation model may be a similarity model or a k-nearest neighbor model. In another example embodiment, the community engine 160 uses one or more models selected from a library of machine learning and data-mining models, such as Apache Mahout.

If topic model analysis is used, then in step 440 the community engine applies a topic model to the input matrices to generate a [topic x community] matrix and a [user x community] matrix. In step 450 the community engine then assigns users to virtual communities, for example by assigning users having a predetermined minimum relationship score with a certain community to that community, or by selecting the set of n users having the highest relationship scores with a particular community to be members of that community.

The topic model(s) may be any suitable model, for example a topic model such as a latent Direchlet allocation (LDA) model, probabilistic latent semantic indexing (PLSI) model, or hierarchical analysis model (e.g., a Multinomial Asymmetric Hierarchical Analysis (MASHA) model or a Hierarchical Probabilistic Latent Semantic Analysis (HPLSA) model) may be used. The topic model may be unsupervised, weakly supervised, or supervised (e.g., the model is trained). In one example embodiment, the topic model is an LDA model. In another example embodiment, the community engine 160 uses an unsupervised topic model, such as an unsupervised LDA model. It is understood that although many topic models were originally designed to categorize or cluster words or terms from documents into common concepts, these models are adaptable to the present embodiments by, e.g., analogizing each user to a document, and the various topics associated with that user as the words or terms.

In step 455, the discovery server 20 stores the matrices produced by the community engine 160, for example in memory 140 of the discovery server 20, or in any other suitable storage area. In step 460, the recommender engine 170 of the discovery server makes recommendations to users based on their virtual communities and/or the network usage information, as is further described with respect to FIG. 9. In step 465, the scheduler engine 140 determines if it is time for an update of network usage information, for example because a predetermined time interval has passed, and instructs the collector engine 150 to obtain a new set of network usage information about the users (thus returning to step 405). If it is not yet time for an update, then the scheduler engine 140 instructs the recommender engine 170 to continue making recommendations based on the current data set in step 460. It is understood that the collector engine 150 may be continuously collecting network usage information, and that the periodicity of updates may factor into when the collector engine 150 feeds the network usage information to other portions of the discovery server 20, or in any other suitable fashion.

Figure 8:
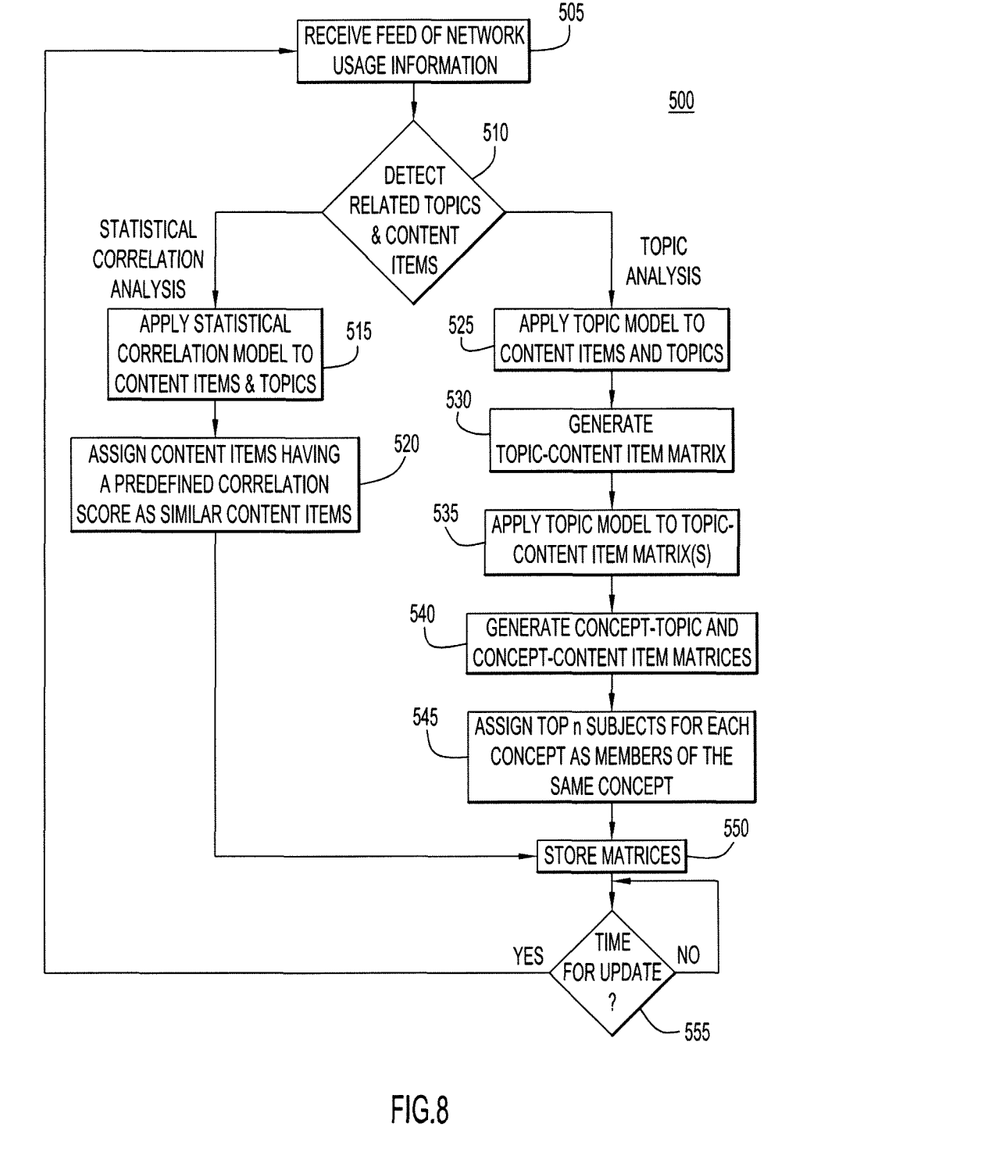
FIG. 8 is an example of a flow chart generally depicting a process of discovering knowledge in the user environment.

FIG. 8 is an example of a flow chart generally depicting a process 500 of discovering knowledge in the user environment that is performed by the discovery server 20, and more particularly the recommender engine 170. In step 505, the recommender engine 170 obtains network usage information about users in the network, for example by collecting it or receiving it as a feed of information from another portion of the discovery server 20. In step 510 the recommender engine 170 detects related topics and content items by analyzing the various topics and content items and/or the generated [user x subject] matrices. The analysis may occur in any suitable fashion, for example using statistical correlation analysis (as shown in steps 515-520) or using topic model analysis (as shown in steps 525-530).

If statistical correlation analysis is used, then in step 515 the recommender engine applies a statistical correlation model (e.g., a similarity or k-nearest neighbor model) to the topics and content items to discover statistical correlations (relationships) between/among topics and/or content items. In step 520 the recommender engine assigns or designates correlated content items as correlated, for example by assigning content items meeting a predetermined minimum correlation score as similar content items, or in any other suitable fashion. The engine then proceeds to step 550.

If topic model analysis is used, then in step 525 the recommender engine applies a topic model (e.g., an unsupervised LDA model) to the topics and content items to discover relationships between/among topics and/or content items, and in step 530 generates a [topic x content item] matrix. In step 535, the recommender engine applies a topic model analysis to the [topic x content item] matrix in order to discover concepts grouping the topics and/or content items, and in step 540 the recommender engine outputs a [concept x topic] matrix and a [concept x content item] matrix. In step 545, the recommender engine then assigns the topics and content items to their concepts, for example by assigning topics having a predetermined minimum relationship score with a certain concept to be a member of that concept, or by selecting the set of n content items having the highest relationship scores with a particular concept to be members of that concept. The engine then proceeds to step 550.

In step 550, the discovery server 20 stores the matrices, correlation scores, and other data produced by the recommender engine 170, for example in memory 140 of the discovery server 20, or in any other suitable storage area. In step 555, the recommender engine 170 and/or the scheduler engine 140 determines if it is time for an update of network usage information, and if so, returns to step 505. If not, the recommender engine remains waiting at step 555 until an update is received.

Figure 9A:
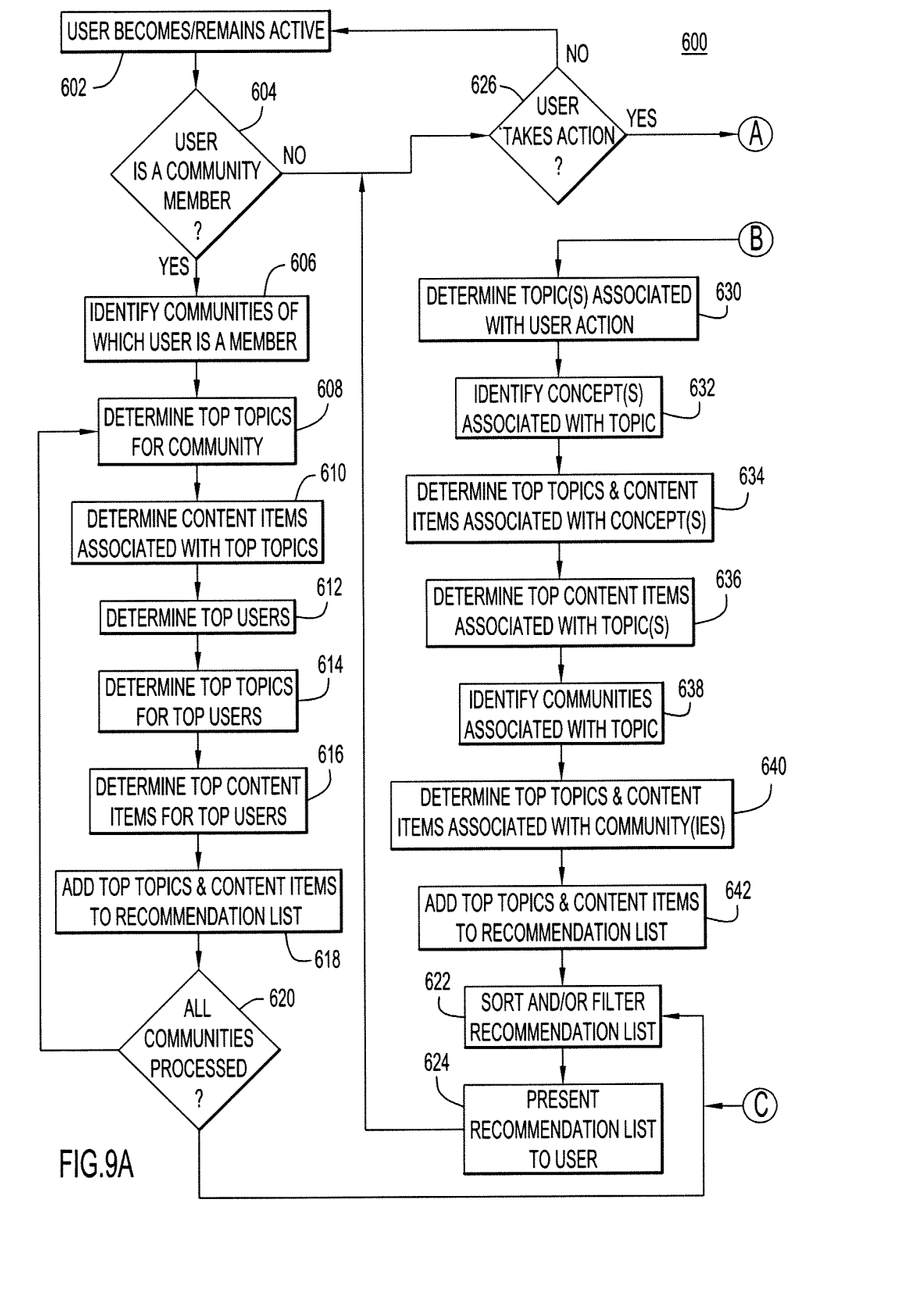
FIG. 9 is an example of a flow chart generally depicting a process of discovering and sharing knowledge in the user environment.
Figure 9B:
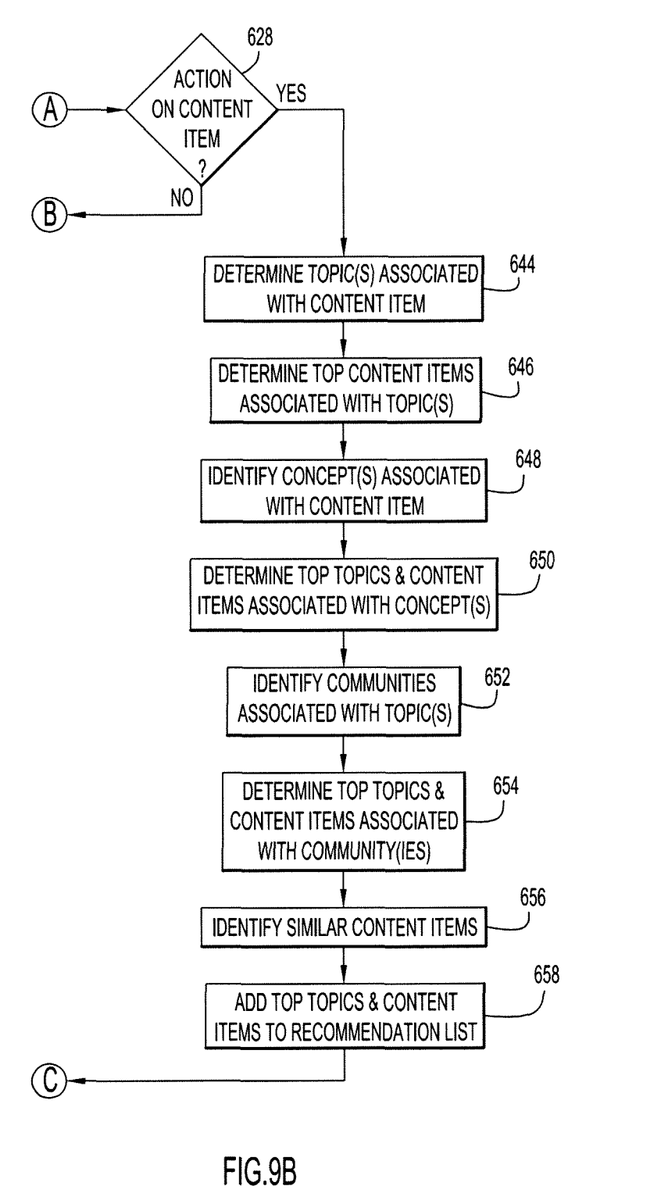

FIG. 9 is an example of a flow chart generally depicting a process 600 of discovering and sharing knowledge in the user environment that is performed by the discovery server 20, and more particularly the recommender engine 170. In step 602, the recommender engine identifies a particular user as becoming active, or remaining active, or in some other state in which recommendations are to be provided to the user. In step 604, the engine determines if the user is a member of one or more virtual communities, and if yes, proceeds to steps 606-624. If not, for example because the user is new to the user environment and has not yet generated sufficient network usage information in order to assign the user to a virtual community, the engine proceeds to step 626, as will be further described.

In step 606, the engine identifies the one or more communities of which the user is a member, for example by using the [user x community] matrix, and then the engine loops through steps 608 through 618 for each community of which the user is a member. In step 608, the engine determines the "top" topics for the community, for example the most popular topics, the hottest topics over a particular time intervals such as a day, week, month, etc., a niche topic of particular interest, a trending topic, topics that have the highest relationship scores with the community as specified in the [topic x community] matrix, etc. In step 610, the engine determines content items that are associated with the top topics, e.g., a particular video that has been viewed many times by the virtual community, or content items having a strong relationship score with the top topics, for example by using the [topic x content item] matrix. In step 612, the engine determines top users for the community, for example the users with the strongest relationship score with the community as specified in the [user x community] matrix, and then in step 614 determines the top topics for those users, for example the topics with the strongest relationship score with the user as specified in the [user x topic] matrix, and in step 616 determines the top content items for those users, for example the content items with the strongest relationship score with the user as specified in the [user x content item] matrix. In step 618, the engine adds the determined topics and content items to a recommendation list for the user, and in step 620 determines if all communities have been processed. If not, the engine returns to step 608 for the next unprocessed community, and if yes the engine proceeds to step 622.

In step 622 the engine may sort, filter, or otherwise process the recommendation list, for example to remove duplicates or items of predicted low value, to highlight certain topics or content items that are currently trending and therefore the "hottest" or that the user has previously rated of high interest, to remove certain topics or content items that the user has previously rated as of low interest, to remove content items that the user has already accessed, etc. In step 624 the engine presents the recommendation list to the user, for example as an email, as a sidebar in a web browser, as highlighted entries in a search list, or the like. For example, the user may log onto her email in the morning and receive an email from the recommender engine that indicates "these 5 content items are the top 5 content items of other users who have a strong interest in Solr", or she may open her web browser and the recommender engine may provide a sidebar in the browser indicating that "you have previously performed searches on the topic 'Solr' and other users who searched for 'Solr' found the topic 'SharePoint' of interest. Click here for more information about 'SharePoint'." Or, for example, the user may log into a content management system or a video sharing site, and view a particular document or video, and then the recommender engine may present her with a notice such as a pop-up window, sidebar, or other notification indicating that "other users who viewed this content item also viewed these content items . . . ". The engine then proceeds to step 626.

In step 626 the recommender engine determines if the user has taken an action that relates to network usage information, such as viewing a content item or performing a browser search. If not, the engine returns to step 602 and may present recommendations to the user based on that user's membership in one or more virtual communities, or return to step 626 if the user takes additional actions. If yes, the engine determines in step 628 whether the action is directly related to a content item or not. If not, the engine proceeds to steps 630-642, and if yes, then the engine proceeds to steps 644-658.

In step 630, the engine determines the topic(s) associated with the user's action, for example if the user has searched for the term "Firefox on Linux" in a web browser, then the engine determines that the action is associated with the topics "Linux" and "Firefox." In step 632, the engine determines the concept(s) associated with the determined topic(s), for example in this case the topic "Firefox" is associated with concept "Browser" and the topic "Linux" is associated with concept "Operating System." In step 634, the engine determines the top topics and content items associated with the determined concept(s), for example by determining the topics with the strongest relationship score with the concept as specified in the [concept x topic] matrix, and the content items with the strongest relationship score with the concept as specified in the [concept x content item] matrix. In step 636, for any determined topic(s), the engine determines the top content items associated with the topic(s), for example by determining the content items with the strongest relationship score with the topic(s) as specified in the [topic x content item] matrix.

In step 638, the engine identifies the community or communities associated with the topic(s), for example determining the communities with the strongest relationship score with the topic(s) as specified in the [topic x community] matrix. Then, in step 640, the engine determines the top topics and content items associated with each identified community, for example by determining the topics or content items having the strongest relationship scores with the community as specified in the [topic x community] matrix, etc. In step 642, the engine adds the determined topics and content items to a recommendation list for the user, in step 622 the engine may sort, filter, or otherwise process the recommendation list, as previously described, before presenting the recommendation list to the user in step 624, as also previously described. The engine then returns to step 626.

In step 644, the engine determines the topic(s) associated with the content item acted upon by the user, for example if the user has opened and edited a document concerning implementing a plugin in the Firefox browser on Linux, the engine determines that the document is associated with the topics "plugin," "Firefox," and "Linux." In step 646 the engine determines the top content items associated with the topic(s), for example by determining the content items with the strongest relationship score with the topic(s) as specified in the [topic x content item] matrix. In step 648, the engine determines the concept(s) associated with the content item, for example in this case the content item is most strongly associated with the concept "Browser." In step 650, the engine determines the top topics and content items associated with the determined concept(s), for example by determining the topics with the strongest relationship score with the concept as specified in the [concept x topic] matrix, and the content items with the strongest relationship score with the concept as specified in the [concept x content item] matrix.

In step 652, the engine identifies the community or communities associated with the topic(s), for example determining the communities with the strongest relationship score with the topic(s) as specified in the [topic x community] matrix. Then, in step 654, the engine determines the top topics and content items associated with each identified community, for example by determining the topics or content items having the strongest relationship scores with the community as specified in the [topic x community] matrix, etc. In step 656, the engine may identify similar content items to the accessed content item, for example by performing a similarity search using a statistical similarity model such as the Pearson or Tanimoto models. In step 658, the engine adds the determined topics and content items to a recommendation list for the user, in step 622 the engine may sort, filter, or otherwise process the recommendation list, as previously described, before presenting the recommendation list to the user in step 624, as also previously described. The engine then returns to step 626.

It is understood that FIG. 9 presents only an example of how a recommender engine may develop and present recommendations to a user, and that the present embodiments are not limited to this process. For example, instead of relying on the use of the matrices, the recommender engine may perform searches, for example searches of the network usage information, similarity searches on content items, and the like. In an example embodiment, the recommender engine may determine one or more subjects (e.g., content items or topics) that have the highest relationship scores to other members of the same virtual community, and may use the determined subjects to identify one or more content items associated with the determined subjects to recommend to the user.

It is also understood that although the present embodiments have been discussed with reference to a business network, the network may be any suitable network such as a public or private network, that is organized for any reason such as business, educational, social, community, or other reasons. Also, although the topics and concepts discussed herein are technology topics, it is understood that any topic and concepts may be identified by the present embodiments, for example in an educational setting the topics may relate to various classes and professors, and the concepts may relate to various fields of study, or in a social setting the topics may relate to various entertainment sources such as musicians and actors, and the concepts may relate to entertainment types such as music or movie genres (e.g., action or romantic comedy).

The present embodiments deliver unique advantages over conventional knowledge sharing approaches. In the present embodiments, users' searching and browsing behavior can be implicitly collected and analyzed statistically to suggest "what's hot" at a point in time, and people who share interests from different silos are virtually connected together to reap the benefits of knowledge sharing.

The above description is intended by way of example only. The description of the present embodiments has been presented for purposes of illustration and description, but is not intended to be exhaustive or limited to the embodiments in the form disclosed. Many modifications and variations will be apparent to those of ordinary skill in the art without departing from the scope and spirit of the embodiments.

The terminology used herein is for the purpose of describing particular embodiments only and is not intended to be limiting of the embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed.

With respect to the Figures, which illustrate the architecture, functionality, and operation of possible implementations of methods, apparatuses, and computer readable media encoded with instructions, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending on the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method comprising:
  obtaining, by a computer, network usage information about a user;
  detecting, by the computer, a plurality of subjects by analyzing the network usage information, wherein the plurality of subjects comprises topics;
  analyzing, by the computer, the network usage information of the user to determine a set of relationship scores, wherein each relationship score describes the strength of a relationship between the user and an individual subject in the plurality of subjects;
  analyzing, by the computer, the set of relationship scores and relationship scores of other users to detect a plurality of virtual communities, wherein the user may be a member of more than one virtual community, and wherein the analyzing the set of relationship scores further comprises:
    generating, by the computer, a user-topic matrix comprising the set of relationship scores for the user and the relationship scores of the other users within the virtual communities, wherein the user-topic matrix identifies one or more topics which are most strongly related with the user and each of the other users, and
    applying, by the computer, a topic model to the user-topic matrix in order to generate a topic-community matrix and a user-community matrix, the topic model comprising a latent Dirichlet allocation model, wherein the topic-community matrix identifies for each topic one or more virtual communities which are most strongly associated with the topic, and the user-community matrix identifies one or more virtual communities which are most strongly associated with the user and in which the user is considered a member;
  in response to a determination that the user is a member of at least one of the virtual communities, recommending, by the computer, one or more content items stored in a storage area to the user based on the virtual communities of which the user is a member, wherein said recommendation further comprises:
    determining, by the computer, one or more topics that have the highest relationship scores for the user;
    for each determined topic:
      using the topic-community matrix to identify one or more virtual communities which are most strongly associated with the topic;
      for each identified virtual community, using the user-community matrix to identify one or more other users who are most strongly associated with that virtual community;
      for each identified other user, using the determined topic to search the network usage information about the identified other user in order to find content items to recommend to the user receiving a recommendation; and
  in response to a determination that the user has taken an action related to the network usage information:
    determining, by the computer, whether the action taken by the user is a direct action that directly relates to a content item in the storage area;
    in response to a determination that the action taken is a direct action, recommending, by the computer, one or more other content items stored in the storage area to the user based at least partially upon at least one topic associated with the content item upon which the direct action is based; and
    in response to a determination that the action taken is not a direct action, recommending, by the computer, one or more other content items stored in the storage area to the user based at least partially upon at least one topic associated with the action taken by the user.

2. The method of claim 1, wherein the subjects further comprise content items.

3. The method of claim 1, further comprising:
  updating virtual community membership by the computer repeating said obtaining, detecting, analyzing the network usage information and analyzing the set of relationship scores steps, wherein said updating may result in changes in one or more relationship scores for the user, and the user being added or deleted as a member of one or more virtual communities.

4. The method of claim 3, wherein said updating occurs at predetermined time intervals.

5. The method of claim 1, wherein said analyzing the set of relationship scores further comprises:
   applying, by the computer, a statistical correlation model to the set of relationship scores and the relationship scores of the other users in order to determine which of the other users are statistically correlated with the user; and
   assigning, by the computer, the user to the same virtual community as the other users who are statistically correlated with the user.

6. The method of claim 5, wherein the statistical correlation model is a similarity model or a k-nearest neighbors model.

7. The method of claim 5, wherein said recommendation further comprises, for each virtual community of which a user is a member:
   determining, by the computer, one or more subjects that have the highest relationship scores to other members of the same virtual community; and
   using the determined subjects to identify one or more content items stored in the storage area and associated with the determined subjects to recommend to the user.

8. An apparatus comprising:
   a memory having a plurality of content items stored therein; and
   a processor configured to:
      obtain network usage information about a user;
      detect a plurality of subjects by analyzing the network usage information, wherein the plurality of subjects comprise topics;
      analyze the network usage information of the user to determine a set of relationship scores, wherein each relationship score describes the strength of a relationship between the user and an individual subject in the plurality of subjects;
      analyze the set of relationship scores and the relationship scores of other users to detect a plurality of virtual communities, wherein the user may be a member of more than one virtual community, and wherein the analyzing the set of relationship scores further comprises:
         generating a user-topic matrix comprising the set of relationship scores for the user and the relationship scores of the other users within the virtual communities, wherein the user-topic matrix identifies one or more topics which are most strongly related with the user and each of the other users, and
         applying a topic model to the user-topic matrix in order to generate a topic-community matrix and a user-community matrix, the topic model comprising a Dirichlet allocation model, wherein the topic-community matrix identifies for each topic one or more virtual communities which are most strongly associated with the topic, and the user-community matrix identifies one or more virtual communities which are most strongly associated with the user and in which the user is considered a member;
      in response to a determination that the user is a member of at least one of the virtual communities, recommend one or more content items stored in said memory to the user based on the virtual communities of which the user is a member, wherein said recommendation further comprises the processor being further configured to:
         determine one or more topics that have the highest relationship scores for the user:
         for each determined topic:
            use the topic-community matrix to identify one or more virtual communities which are most strongly associated with the topic;
            for each identified virtual community, use the user-community matrix to identify one or more other users who are most strongly associated with that virtual community; and
            for each identified other user, use the determined topic to search the network usage information about the identified other user in order to find content items to recommend to the user receiving a recommendation; and
         in response to a determination that the user has taken an action related to the network usage information:
            determine whether the action taken by the user is a direct action that directly relates to a content item in the storage area;
            in response to a determination that the action taken is a direct action, recommend one or more other content items stored in the storage area to the user based at least partially upon at least one topic associated with the content item upon which the direct action is based; and
            in response to a determination that the action taken is not a direct action, recommend one or more other content items stored in the storage area to the user based at least partially upon at least one topic associated with the action taken by the user.

9. The apparatus of claim 8, wherein said analyzing the set of relationship scores comprises the processor being further configured to:
   apply a statistical correlation model to the set of relationship scores and the relationship scores of the other users in order to determine which of the other users are statistically correlated with the user, wherein the statistical correlation model is a similarity model or a k-nearest neighbors model; and
   assign the user to the same virtual community as the other users who are statistically correlated with the user; and
   wherein said recommendation comprises, for each virtual community of which the user is a member, the processor being further configured to:
      determine one or more subjects that have the highest relationship scores to other members of the same virtual community; and
      use the determined subjects to identify one or more content items associated with the determined subjects to recommend to the user.

10. One or more computer readable storage devices encoded with instructions that, when executed by a processor, cause the processor to:
   obtain network usage information about a user;
   detect a plurality of subjects by analyzing the network usage information, wherein the plurality of subjects comprises topics;
   analyze the network usage information of the user to determine a set of relationship scores, wherein each relationship score describes the strength of a relationship between the user and an individual subject in the plurality of subjects;

analyze the set of relationship scores and the relationship scores of other users to detect a plurality of virtual communities, wherein the user may be a member of more than one virtual community, and wherein the analyzing the set of relationship scores further comprises:

generating a user-topic matrix comprising the set of relationship scores for the user and the relationship scores of the other users within the virtual communities, wherein the user-topic matrix identifies one or more topics which are most strongly related with the user and each of the other users, and applying a topic model to the user-topic matrix in order to generate a topic-community matrix and a user-community matrix, the topic model comprising a Dirichlet allocation model, wherein the topic-community matrix identifies for each topic one or more virtual communities which are most strongly associated with the topic, and the user-community matrix identifies one or more virtual communities which are most strongly associated with the user and in which the user is considered a member;

in response to a determination that the user is a member of at least one of the virtual communities, recommend one or more content items stored in said memory to the user based on the virtual communities of which the user is a member; and in response to a determination that the user has taken an action related to the network usage information:

determine whether the action taken by the user is a direct action that directly relates to a content item in the storage area;

in response to a determination that the action taken is a direct action, recommend one or more other content items stored in the storage area to the user based at least partially upon at least one topic associated with the content item upon which the direct action is based; and in response to a determination that the action taken is not a direct action, recommend one or more other content items stored in the storage area to the user based at least partially upon at least one topic associated with the action taken by the user.

11. The one or more computer readable storage devices of claim 10, further comprising instructions that when executed cause the processor to:

update virtual community membership by the computer repeating said obtaining, detecting, analyzing the network usage information and analyzing the set of relationship scores steps, wherein said updating may result in changes in one or more relationship scores for the user, and the user being added or deleted as a member of one or more virtual communities.

12. The one or more computer readable storage devices of claim 10, wherein said analyzing the set of relationship scores comprises further instructions that when executed cause the processor to:

apply a statistical correlation model to the set of relationship scores and the relationship scores of the other users in order to determine which of the other users are statistically correlated with the user, wherein the statistical correlation model is a similarity model or a k-nearest neighbors model; and assign the user to the same virtual community as the other users who are statistically correlated with the user.

13. The one or more computer readable storage devices of claim 10, wherein said recommendation further comprises, for each virtual community of which a user is a member, instructions that when executed cause the processor to:

determine one or more subjects that have the highest relationship scores to other members of the same virtual community; and use the determined subjects to identify one or more content items associated with the determined subjects to recommend to the user.

\* \* \* \* \*